US006757614B2

(12) United States Patent
Pepper et al.

(10) Patent No.: US 6,757,614 B2
(45) Date of Patent: Jun. 29, 2004

(54) SEISMIC SIGNAL PROCESSING METHOD AND APPARATUS FOR GENERATING CORRELATION SPECTRAL VOLUMES TO DETERMINE GEOLOGIC FEATURES

(75) Inventors: Randolph E. F. Pepper, Sugar Land, TX (US); Peter P. Van Bemmel, Houston, TX (US)

(73) Assignee: Schlumberger Technology Corporation, Houston, TX (US)

( * ) Notice: Subject to any disclaimer, the term of this patent is extended or adjusted under 35 U.S.C. 154(b) by 0 days.

(21) Appl. No.: 10/017,565

(22) Filed: Dec. 14, 2001

(65) Prior Publication Data

US 2002/0128778 A1 Sep. 12, 2002

Related U.S. Application Data

(60) Provisional application No. 60/256,661, filed on Dec. 18, 2000.

(51) Int. Cl.[7] .................................................. G01V 1/00
(52) U.S. Cl. .......................................... 702/14; 367/73
(58) Field of Search .............................. 702/14; 367/73

(56) References Cited

U.S. PATENT DOCUMENTS

| 4,679,174 A | * | 7/1987 | Gelfand ........................ 367/73 |
| 5,838,564 A | * | 11/1998 | Bahorich et al. ............. 702/16 |
| 5,838,634 A | * | 11/1998 | Jones et al. ................... 367/73 |
| 5,870,691 A |  | 2/1999 | Partyka et al. |
| 5,873,051 A | * | 2/1999 | Van Bemmel et al. ........ 702/17 |
| 5,995,907 A | * | 11/1999 | Van Bemmel et al. ........ 702/16 |
| 6,151,555 A | * | 11/2000 | Van Bemmel et al. ........ 702/14 |
| 6,240,370 B1 |  | 5/2001 | Sonneland et al. |
| 6,374,185 B1 | * | 4/2002 | Taner et al. ..................... 702/6 |
| 6,381,543 B1 | * | 4/2002 | Guerillot et al. .............. 702/13 |

OTHER PUBLICATIONS

Assess survey, dated 1982, eight (8) pages.

* cited by examiner

Primary Examiner—John Barlow
Assistant Examiner—Toan M Le
(74) Attorney, Agent, or Firm—John Bouchard; Danita Maseles

(57) ABSTRACT

A seismic signal processing method will analyze a resultant set of seismic data, generated in response to a seismic operation performed on a particular portion of an Earth formation, for the purpose of determining a set of geologic characteristics of the particular portion of the Earth formation. When the seismic signal processing method is performed, a cross correlation technique is utilized. In particular, a first data set, which represents a standard set of 'comparison traces having known geologic characteristics' and includes two or more traces having known geologic characteristics but does not constitute a part of an input seismic volume, is cross correlated with a second data set having unknown geologic characteristics. As a result of that cross correlation, an output record, known as a 'correlation spectral volume', is generated. The 'correlation spectral volume' records and displays the degree to which the unknown geologic characteristics of the second data set substantially matches one or more of the known geologic characteristics of the first data set.

22 Claims, 15 Drawing Sheets

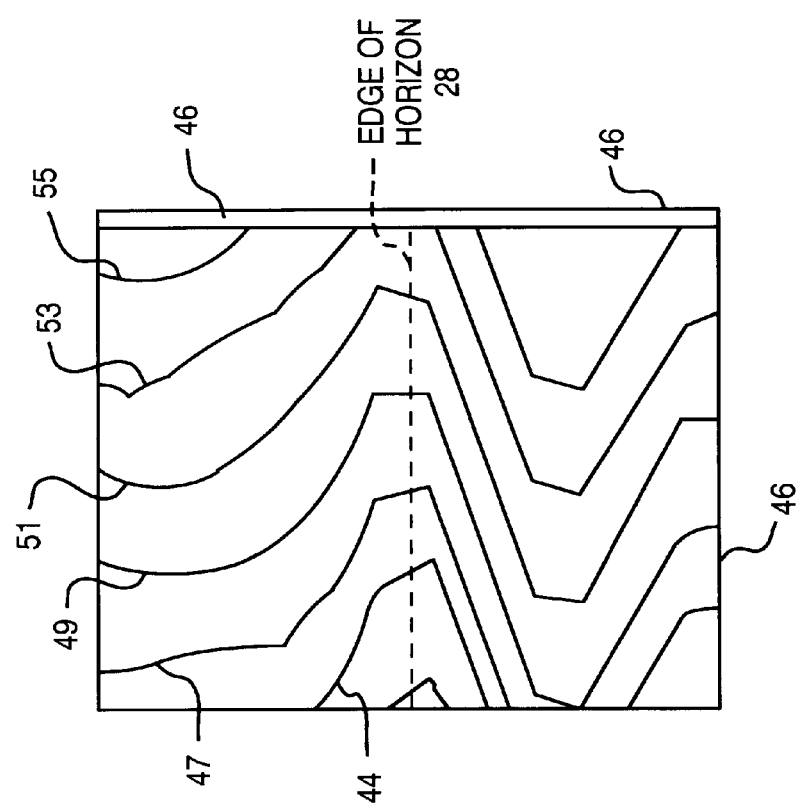

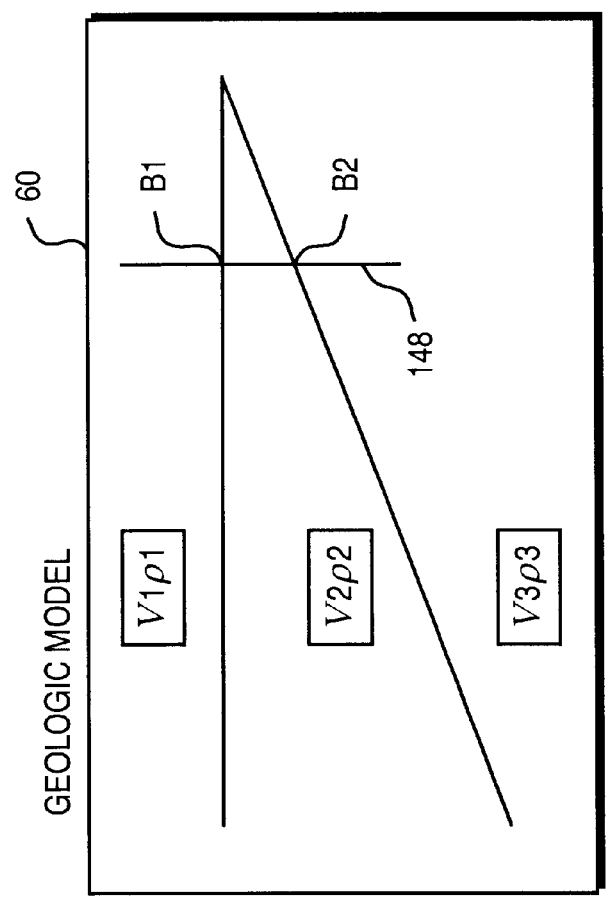

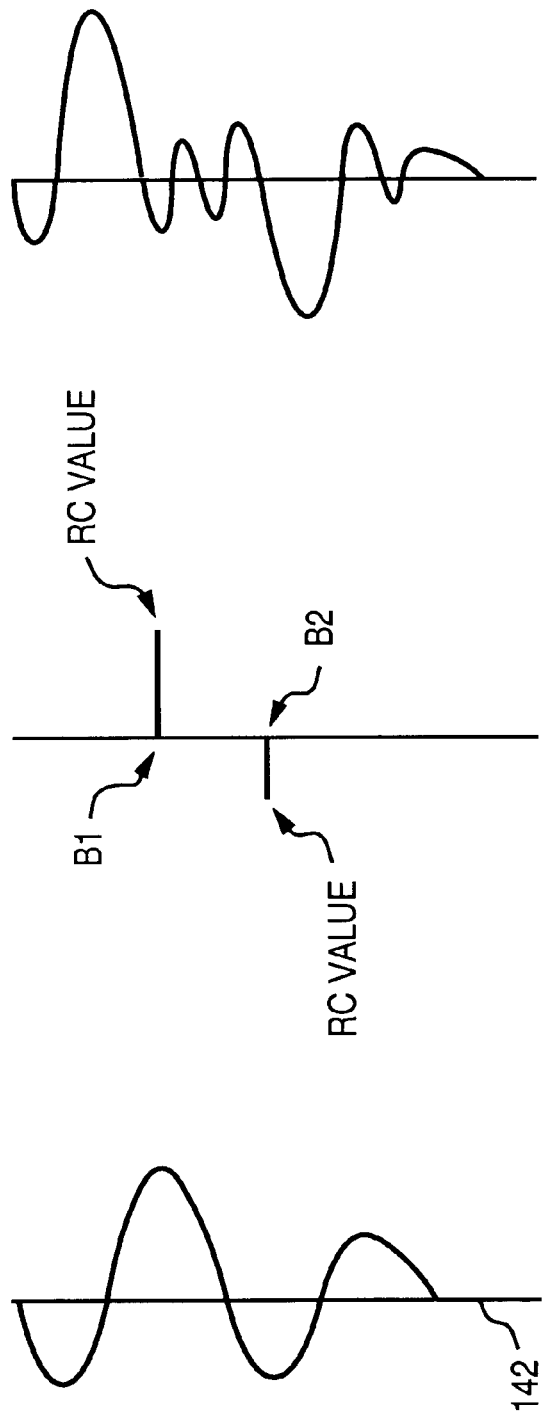
FIG. 5F SYNTHETIC TRACE FROM SYNTHETIC MODEL
FIG. 5E REFLECTION COEFFICIENT (RC)
FIG. 5D SEISMIC WAVELET

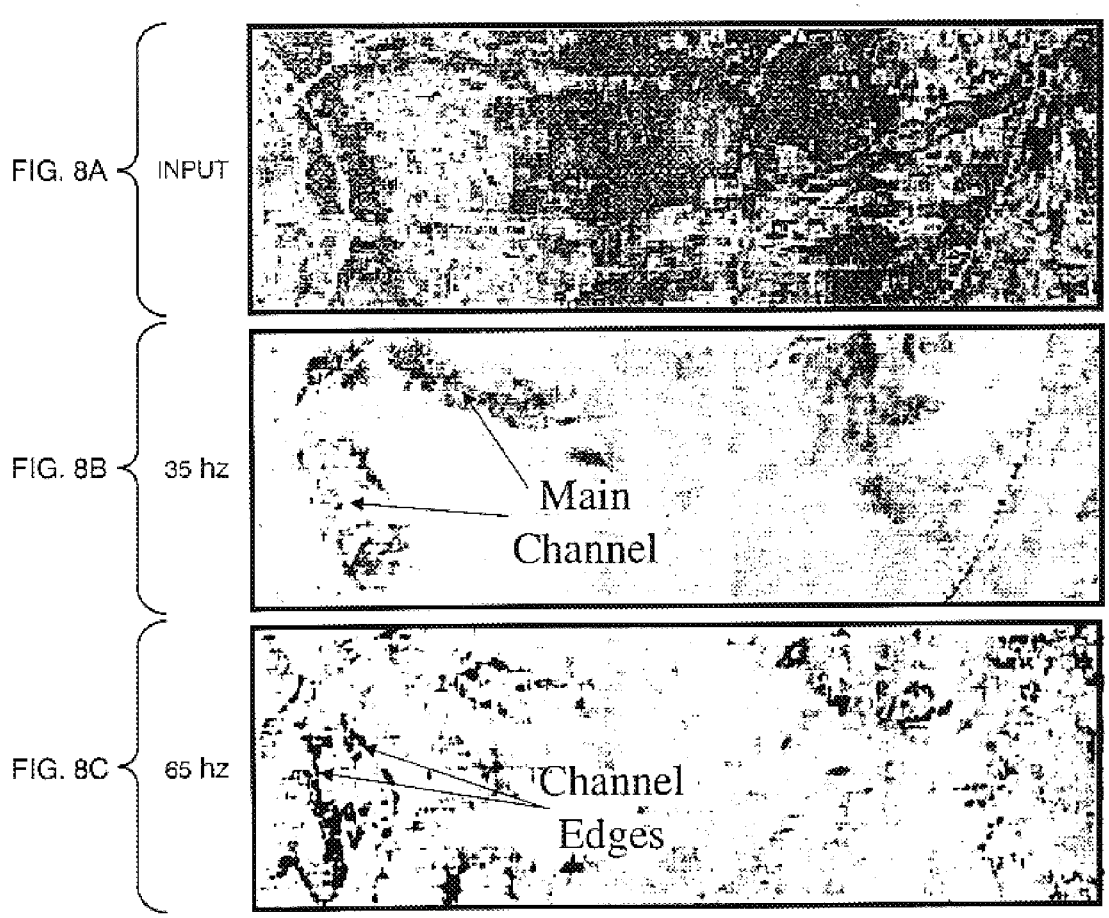

SEISMIC SIGNAL PROCESSING METHOD AND APPARATUS FOR GENERATING CORRELATION SPECTRAL VOLUMES TO DETERMINE GEOLOGIC FEATURES

CROSS REFERENCE TO RELATED APPLICATIONS

This application claims priority under 35 U.S.C. § 119(e) of U.S. Provisional Application Serial No. 60/256,661 filed Dec. 18, 2000 and entitled "Seismic signal processing method and apparatus for generating correlation spectral volumes to determine geologic features" the contents of which is incorporated herein in its entirety by reference.

BACKGROUND

The subject matter of the present invention relates to a method and apparatus for comparing, via a cross-correlation technique, a first data set having known geologic features with a second data set having unknown geologic features thereby generating an output record, known as a 'correlation spectral volume', which records and displays the degree to which the unknown geologic features of the second data set substantially match one or more of the known geologic features of the first data set.

When a seismic operation is performed on a particular portion of an Earth formation, a resultant set of seismic data is generated. The seismic data must be analyzed to determine a set of geologic characteristics of the particular portion of the Earth formation. A first analysis method which may be used to perform this analysis of the resultant set of seismic data involves the use of the Fast Fourier Transform. A second analysis method which may be used to perform the aforementioned analysis involves the use of the so-called Chebyshev Decomposition. However, neither the Fast Fourier Transform nor the Chebyshev Decomposition include a mechanism for using any suitable set of standard comparison traces (which are not necessarily a part of an input seismic volume) having known geologic characteristics for comparison against a set of other traces having unknown geologic characteristics to thereby produce an output record that records the differences, in geologic characteristics, between each of the 'known geologic characteristic' standard comparison traces and each of the 'unknown geologic characteristic' other traces.

Therefore, a third analysis method is needed for performing the analysis of the resultant set of seismic data for the purpose of determining the set of geologic characteristics of the particular portion of the Earth formation. That third analysis method is summarized below and is set forth in detail in the 'Description of the Invention' section of this specification.

SUMMARY

Accordingly, a third analysis method is disclosed for performing an analysis of a resultant set of seismic data, generated in response to a seismic operation performed on a particular portion of an Earth formation, for the purpose of determining a set of geologic characteristics of the particular portion of the Earth formation. When the third analysis method is performed, a cross-correlation technique is utilized. In particular, a first data set having known geologic characteristics is compared, via the cross-correlation technique, with a second data set having unknown geologic characteristics. As a result of this comparison using the cross-correlation technique, an output record, known as a 'correlation spectral volume', is generated. The 'correlation spectral volume' records and displays the degree to which the unknown geologic characteristics of the second data set substantially matches one or more of the known geologic characteristics of the first data set. The first data set does not include one or more traces from an input seismic volume. Rather, the first data set can include any suitable set of traces that one would want to use as 'standard comparison traces having known geologic characteristics'. In particular, in the embodiments of invention disclosed herein, the first data set (which represents the 'standard comparison traces having known geologic characteristics') is comprised of two or more traces having known geologic features and includes either a set of Kernel Functions or a Synthetic Model derived from a Geologic Model. The second data set having unknown geologic characteristics include either a plurality of autocorrelation functions which are derived from a corresponding plurality of input seismic volume traces or the plurality of input seismic volume traces.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIGS. 1B, 1C, 1D, and 1E illustrate a method of generating 'received seismic traces' including reflecting acoustic energy off a horizon in an Earth formation, receiving said acoustic energy in certain geophones situated on the Earth's surface, and generating said 'received seismic traces', where each seismic trace includes a plurality of seismic data samples;

FIGS. 5B, 5C, 5D, 5E, 5F, and 5G explain and discuss some of the concepts inherently present in the flowchart in FIG. 6 of the drawings, FIG. 6 representing a detailed construction of the 'generate synthetic model' block of FIG. 4; and FIGS. 8A, 8B, and 8C illustrate examples of the correlation spectral volume which is generated when the correlation transform software of the present invention has completed its analysis of the resultant set of seismic data, the correlation spectral volume determining and illustrating the set of geologic characteristics of the particular portion of the Earth formation.

DETAILED DESCRIPTION

Figure 1A:
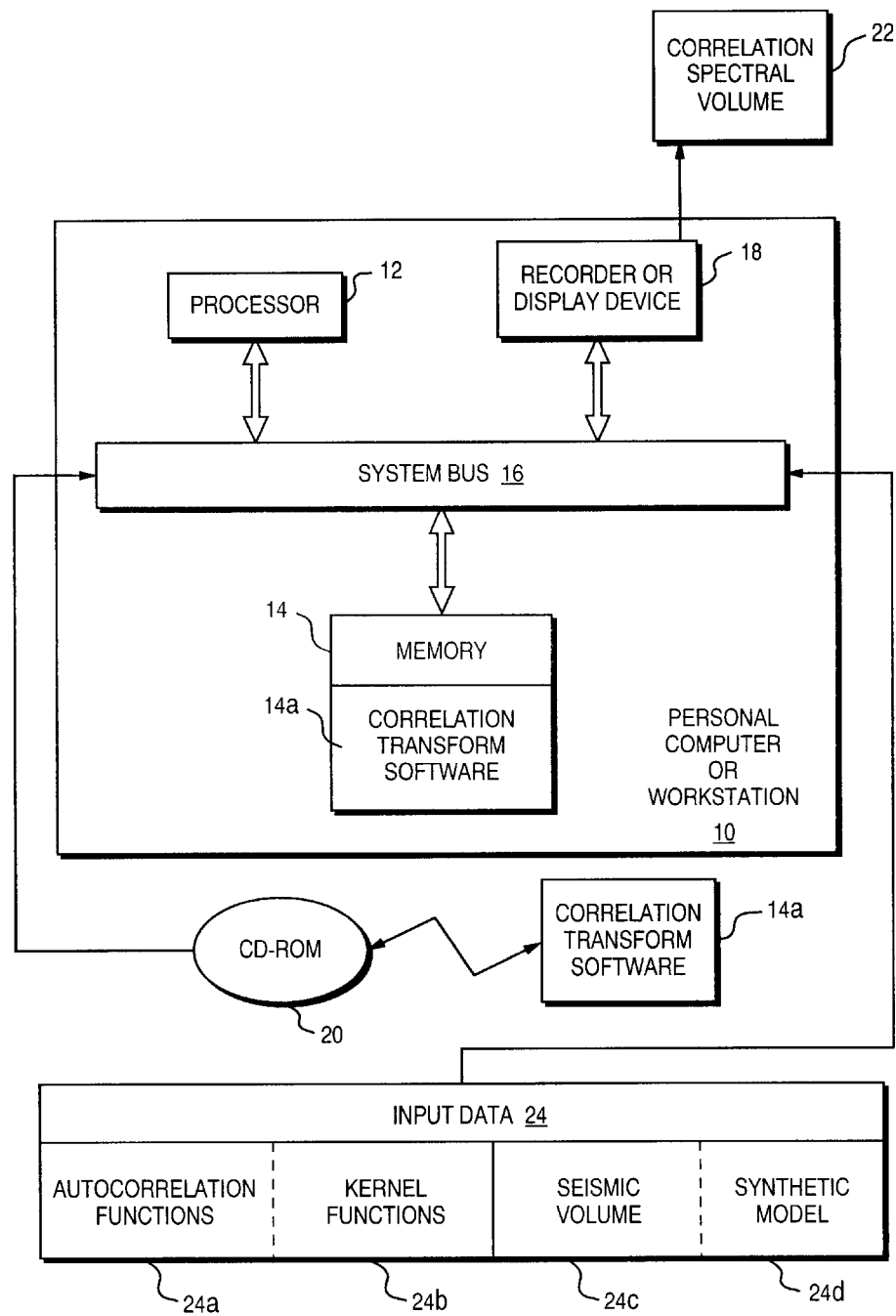
FIG. 1A illustrates a personal computer or workstation which stores the 'correlation transform software' of the present invention.

Referring to FIG. 1A, a computer system 10 is illustrated. The computer system 10 may be a personal computer, a workstation, a mainframe, etc. Examples of possible workstations include a Silicon Graphics Indigo 2 workstation and a Sun SPARC workstation. The computer system 10 stores and executes software instructions which are stored in a memory of the workstation. The computer system 10 includes a programmable processor 12, a recorder or display device 18, and a memory 14 (e.g., a computer readable medium) coupled to a system bus 16. The memory 14 is adapted to store a software package therein, in accordance with the present invention, called the 'correlation transform software' 14a. The 'correlation transform software' 14a is loaded from a CD-Rom 20 into the memory 14 of the computer system 10. The CD-Rom 20 also stores the 'correlation transform software' 14a thereon. The processor 12 may be, for example, a microprocessor, microcontroller, or a mainframe or workstation processor. The memory 14 may be, for example, a hard disk, ROM, CD-ROM, DRAM, or other RAM, flash memory, magnetic storage, optical storage, registers, or other volatile and/or non-volatile memory. Input data 24 is provided to and introduced into the computer system 10. That input data 24 includes either: (1) Autocorrelation Functions 24a and Kernel Functions 24b, or (2) Seismic Volume data 24c and a Synthetic Model 24d. In operation, the processor 12 of the computer system 10: receives the input data 24 (i.e., either the Autocorrelation Functions 24a/Kernel Functions 24b or the Seismic volume data 24c/Synthetic Model 24d), executes the 'correlation transform software' 14a stored in the memory 14 in response to the input data 24, and, when the execution of the correlation transform software 14a is complete, a 'correlation spectral volume' 22 is generated. A further discussion of the seismic signal processing method practiced by the correlation transform software 14a of FIG. 1A, in conjunction with the input data 24, is set forth below with reference to FIGS. 2, 3A, and 3B of the drawings.

Figure 1B:
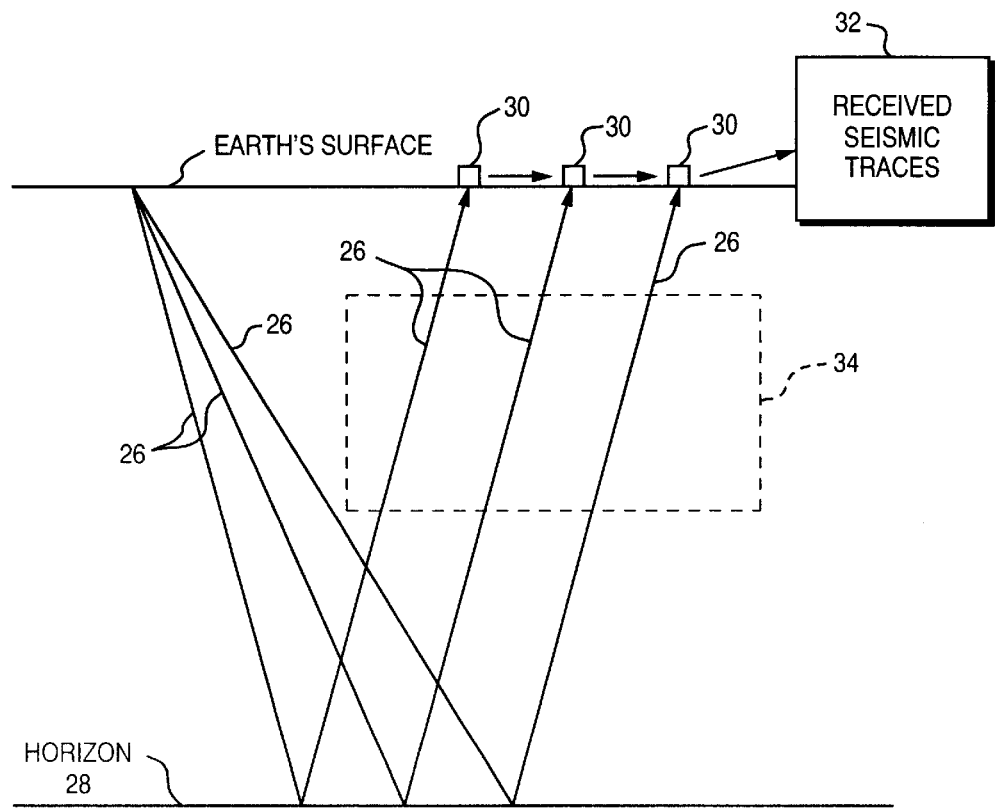
Figure 1C:
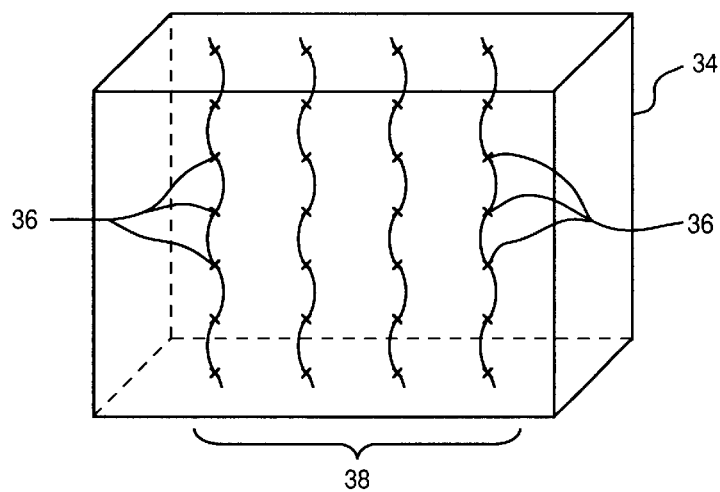
Figure 1D:
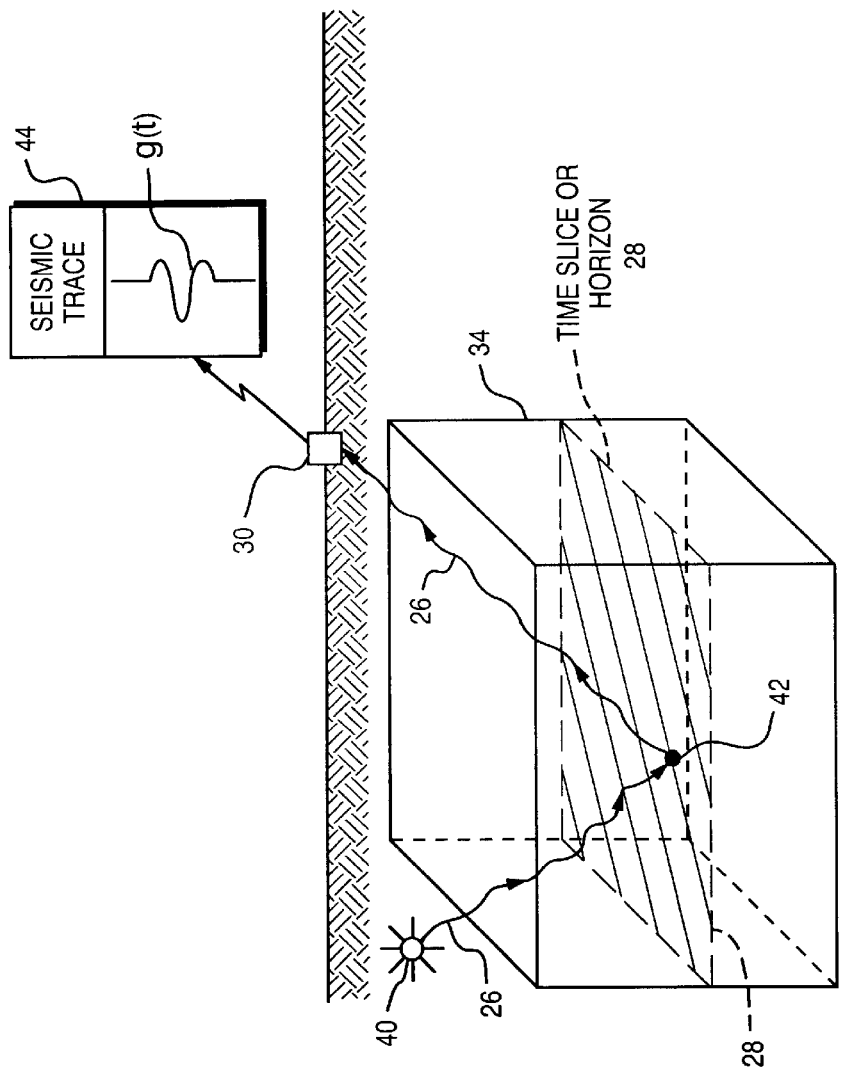

Referring to FIGS. 1B through 1E, referring initially to FIG. 1B, an explosive energy source situated at the Earth's surface generates acoustic energy 26, the acoustic energy 26 reflecting off a horizon 28. The acoustic energy 26 then propagates back to the Earth's surface where the energy 26 is received in a plurality of geophones 30. The geophones 30 generate a plurality of 'received seismic traces' 32. In FIG. 1B, assume that a particular volume of Earth 34 encloses the acoustic energy 26 which is being reflected off the horizon 28 in the Earth formation. In FIG. 1C, assume further that the particular volume of Earth 34 includes and encloses (by way of example only) four acoustic energy seismic traces 38, where each of the acoustic energy seismic traces 38 further include a plurality of seismic data samples 36. In FIG. 1D, the explosive energy source 40 generates the acoustic energy 26 which reflects off a point 42 on a time slice or horizon 28 in a particular volume of Earth 34 in an Earth formation. The reflected acoustic energy 26 propagates upwardly to the Earth's surface, where the geophone 30 receives the upwardly propagating acoustic energy 26 and, responsive thereto, the geophone 30 generates a seismic trace "g(t)" 44, which is only one seismic trace among a 'plurality of such seismic traces'. In FIG. 1E, a 'plurality of such seismic traces' 46 is illustrated. The 'plurality of such seismic traces' 46 includes the seismic trace 44, and additional seismic traces 47, 49, 51, 53, and 55. The 'plurality of such seismic traces' 46 of FIG. 1E are further illustrated in FIGS. 2, 3A, and 3B where they are known as an 'Input Seismic volume'.

Figure 2:
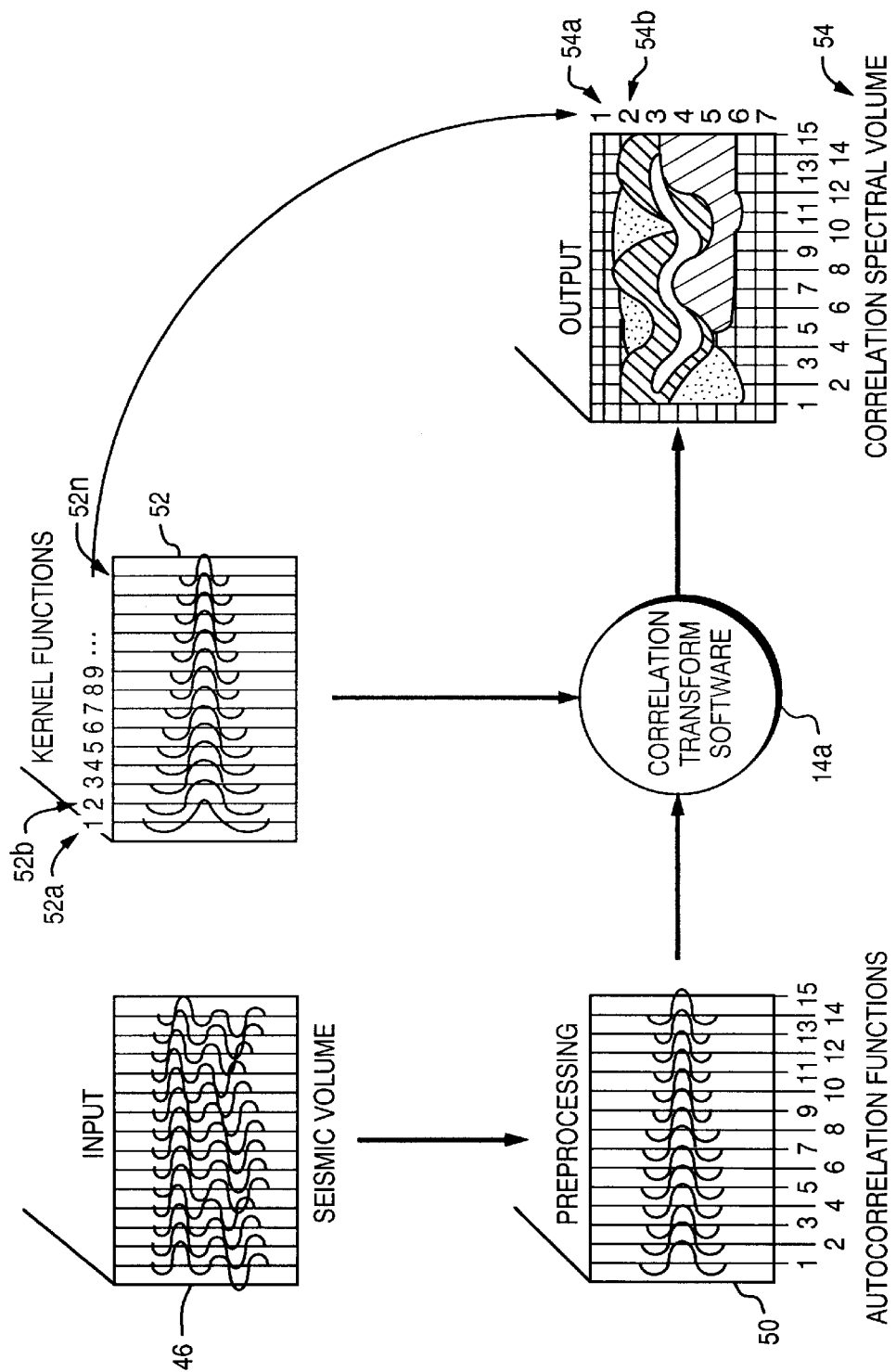
FIGS. 2 and 3A illustrate, graphically, how the aforementioned 'correlation transform software' performs the aforementioned third analysis method for analyzing a resultant set of seismic data, which was generated in response to a seismic operation performed on a particular portion of an Earth formation, for the purpose of determining a set of geologic characteristics of the particular portion of the Earth formation.
Figure 3A:
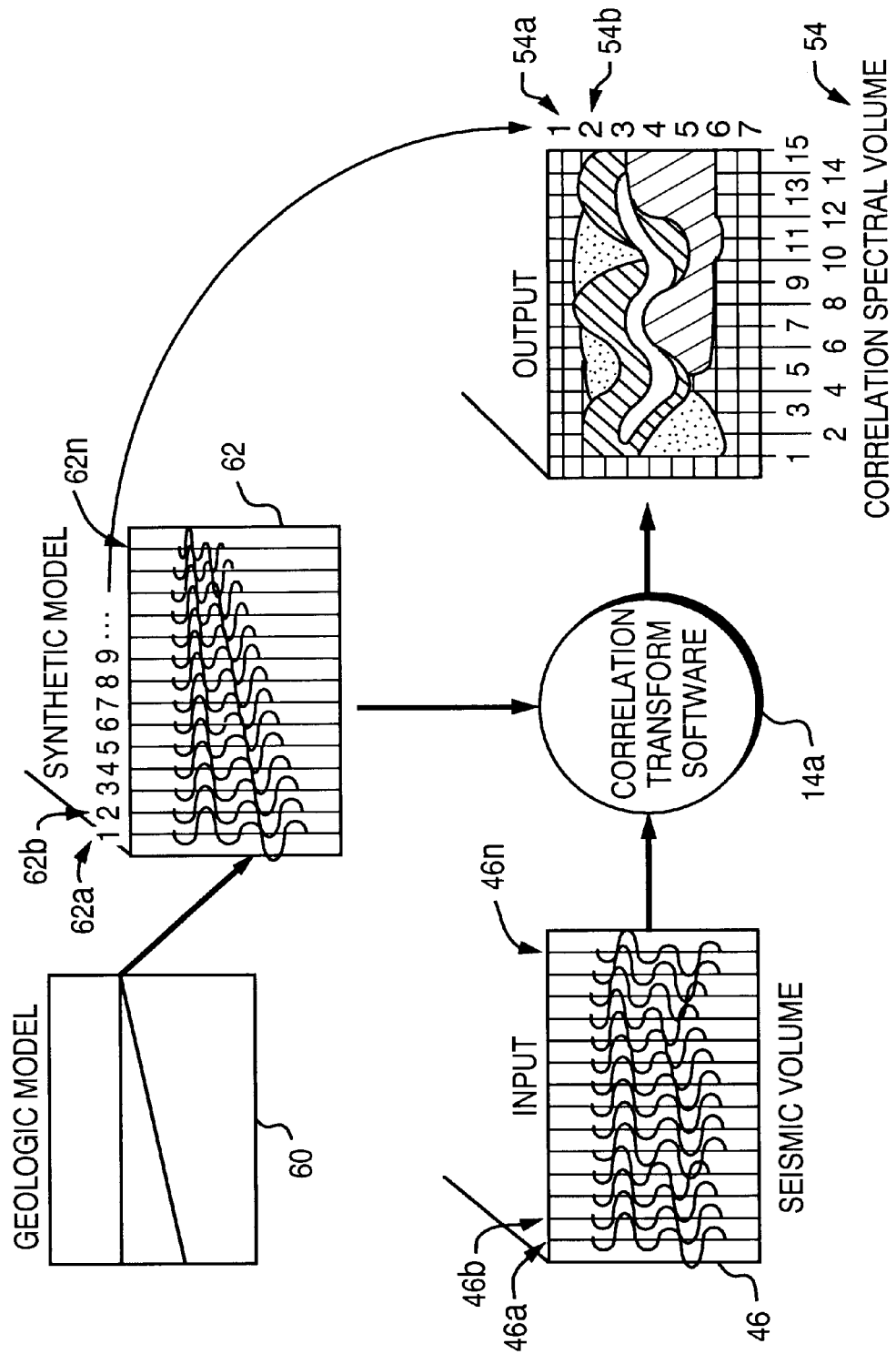
Figure 3B:
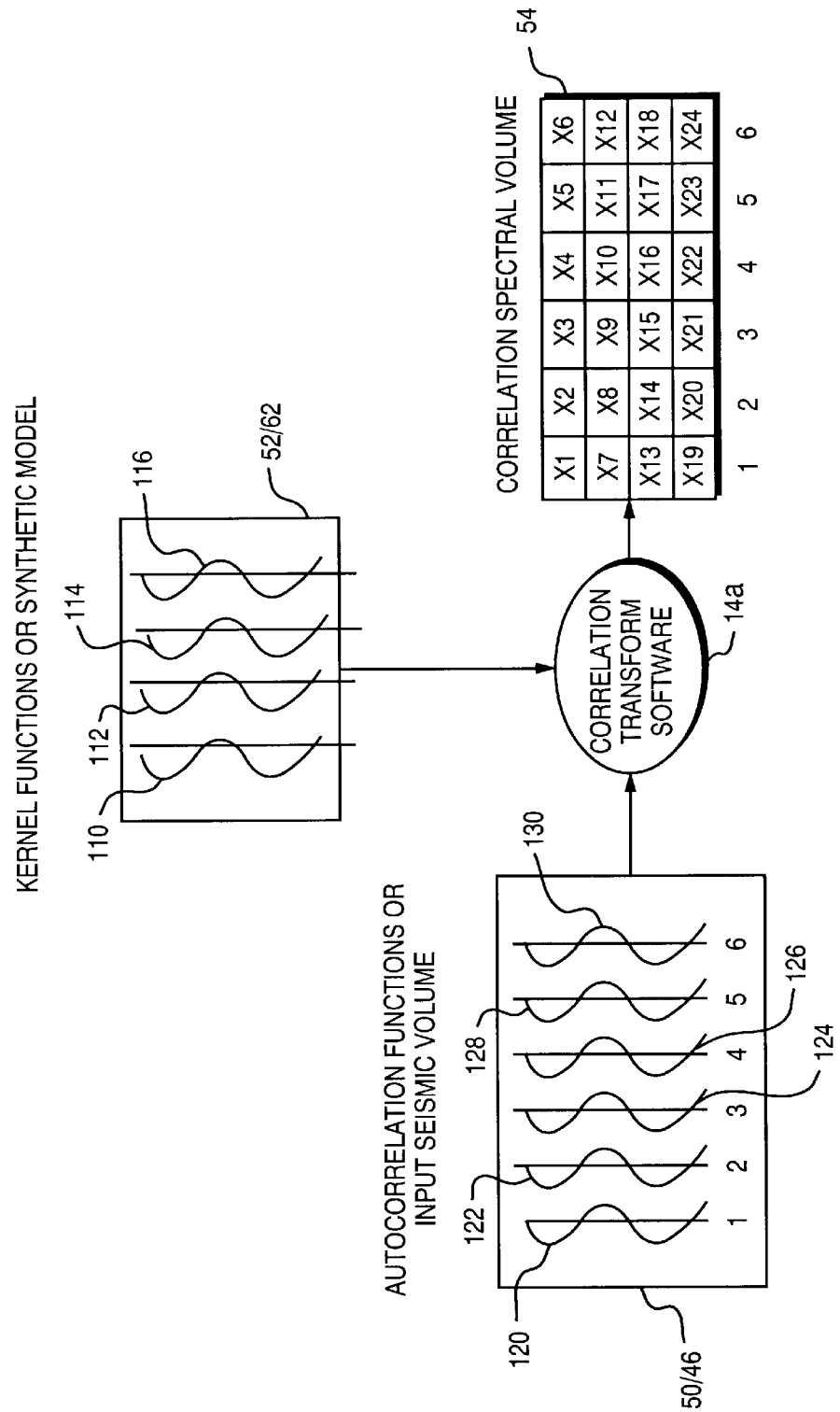
FIG. 3B illustrates, in greater detail, how the aforementioned 'correlation transform software' of FIGS. 2 and 3A performs the aforementioned third analysis method for analyzing the resultant set of seismic data for the purpose of determining the set of geologic characteristics of the particular portion of the Earth formation.

Referring to FIGS. 2, 3A, and 3B, a block diagram is illustrated which graphically illustrates how a 'correlation transform software' of the present invention performs a third analysis method for analyzing a resultant set of seismic data (which was generated in response to a seismic operation performed on a particular portion of an Earth formation, known as an 'input seismic volume') for the purpose of determining a set of geologic characteristics of the particular portion of the Earth formation.

In FIGS. 2 and 3A, we generate a collection of synthetic time series (models or Kernel Functions) which represent a range of potential geologic features of interest. We compare each of these model traces to a plurality of seismic traces on a narrow time window to identify which of the model traces best represents the seismic signature within that time window. Cross-correlation is the preferred mathematical tool although many other methods would also work (e.g., differencing). An output volume is generated where the spatial location (geographic position) of the trace is the same as the input seismic trace, but whereas the third dimension on the seismic trace is two-way travel time, the third dimension of the Correlation Spectral Volume is the sequenced peak correlation values (in the case of cross-correlation) for the collection of synthetic model traces or Kernel Functions. The advantage of this method is that it does not require orthonormal or invertible transforms.

In FIG. 2, a 'system and corresponding analysis method for analyzing an input seismic volume to determine a set of geologic characteristics of an Earth Formation' is illustrated. FIG. 2 shows an initial 3D seismic volume as an input. This technique will generate the autocorrelation function within a user specified window and output these autocorrelation functions as a preprocessed volume for the next step. An optional step could be performed in parallel to generate the autocorrelation function for the entire trace. This full trace autocorrelation is insensitive to geology and is representative of the seismic wavelet. This full trace autocorrelation can be processed through the same procedure as the window of interest and then inverted and used as a normalization operator to remove the bias of the seismic signature. Once the autocorrelation functions are generated, the autocorrelation functions are then cross-correlated with a series of Kernel functions. In the embodiments disclosed herein, the Kernel functions do not include one or more traces from an input seismic volume 46. Rather, the Kernel functions represent 'standard comparison traces having known geologic characteristics'. In particular, the Kernel functions are comprised of two or more traces having known geologic characteristics, whereas the autocorrelation functions are comprised of two or more traces having unknown geologic characteristics, As shown in the sample outputs of FIGS. 8A–8C, one possible kernel function could be derived from the dominant spectral frequencies of a geologic section, such as 8, 37, and 65 hertz. In FIG. 2, an input seismic volume 46 (which represents a 'window of interest' including a subset of the 'plurality of such seismic traces' 46 of FIG. 1E) comprises a plurality of seismic traces in the 'window of interest'. Each of the seismic traces in the input seismic volume 46 undergo autocorrelation (known as the 'autocorrelation technique'). The 'autocorrelation technique' is adequately described in U.S. Pat. No. 6,151,555 to Van Bemmel et al (see FIG. 20), the disclosure of which is incorporated by reference into the specification of this application. As a result, a plurality of autocorrelation functions 50 are produced when the plurality of seismic traces in the input seismic volume 46 undergo autocorrelation via the 'autocorrelation technique'. A plurality of Kernel Functions 52 have already been generated. The Kernel Functions 52 are a collection of synthetic time series representing a range of potential geologic features of interest. That is, the Kernel Functions 52 include a plurality of 'seismic trace like' functions that inherently represent and correspond to a set of known geologic features of an Earth Formation. It is important to understand that the Kernel Functions 52 correspond to the set of 'known' geologic features of the Earth Formation, since a set of all the 'known' geologic features inherent in each of the Kernel Functions 52 will be 'compared' (in a 'comparison technique') to a set of all the 'unknown' geologic features inherent in each of the autocorrelation functions 50. In accordance with one aspect of the present invention, that 'comparison technique' will be a 'cross-correlation technique'. The 'cross-correlation technique' is adequately described in U.S. Pat. No. 6,151,555 to Van Bemmel et al, the disclosure of which has already been incorporated by reference into this specification. The 'cross-correlation technique' is also described in U.S. Pat. No. 5,563,949 to Bahorich et al, the disclosure of which is incorporated by reference into this specification. Thus, in FIG. 2, the 'Unknown geologic feature autocorrelation functions' 50 and the 'Known geologic feature Kernel Functions' 52 are both provided as input data to the 'correlation transform software', which represents the correlation transform software 14a in FIG. 1A in accordance with the present invention. Note that the correlation transform software 14a in FIG. 2 generates an output 54 which is called a 'correlation spectral volume' 54.

The 'system and corresponding analysis method for analyzing an input seismic volume to determine a set of geologic characteristics of an Earth Formation', which was discussed above with reference to FIG. 2, is set forth in more detail below with reference to FIG. 2 of the drawings.

In FIG. 2, each of the Kernel Functions 52 undergo cross-correlation with each of the Autocorrelation Functions 50, via the correlation transform software 14a, and, as a result, the correlation spectral volume 54 is generated. To be more specific, Kernel Function (1) 52a is cross-correlated with each of the Autocorrelation Functions 50 thereby generating row (1) 54a of the Correlation Spectral Volume 54. Then, Kernel Function (2) 52b is cross-correlated with each of the Autocorrelation Functions 50 thereby generating row (2) 54b of the Correlation Spectral Volume 54. This process continues until the last remaining Kernel Function 52n is cross-correlated with each of the Autocorrelation Functions 50 thereby generating the last remaining row of the Correlation Spectral volume 54. If a particular 'cross-correlation' value on the Correlation Spectral Volume 54 is a high value, this indicates that the geologic characteristic associated with one particular Kernel Function substantially matches the geologic characteristic associated with one particular Autocorrelation Function; and, since the geologic characteristic of the one particular Kernel Function is a known quantity, then, the unknown geologic characteristic of the one particular Autocorrelation Function could be interpreted as substantially equal to the known geologic characteristic of the one particular Kernel Function. As a result, the 'Unknown' geologic characteristics of one or more of the Autocorrelation Functions 50 and therefore one or more of the Input Seismic volume 46 can be determined from the 'Known' geologic characteristics of one or more of the Kernel Functions 52 by viewing the 'cross-correlation values' appearing on the Correlation Spectral Volume 54. A sample Correlation Spectral Volume 54 can be seen in FIGS. 8A–8C of the drawings.

In FIG. 3A, a 'further system and corresponding analysis method for analyzing an input seismic volume to determine a set of geologic characteristics of an Earth Formation' is illustrated. FIG. 3A shows an initial 3D seismic volume as the input. This technique will generate a synthetic seismic wedge model at a user defined resolution using an existing seismic wavelet, or a wavelet extracted directly from the seismic data. Each trace of the synthetic seismic wedge model is then cross-correlated with the seismic traces from a user defined zone of interest. The correlation functions are automatically picked and the resulting peak correlation values are stored in a 3D volume. High correlation values will be used to estimate geologic formation thickness (or other geologic features within the seismic resolution) and areal extent. In FIG. 3A, a geologic model 60 having known geologic characteristics is generated, and, from that geologic model 60, a synthetic model 62 consisting of a plurality of 'seismic trace like' traces and having the same 'Known' geologic characteristics is generated. In addition, the input seismic volume 46 (which represents a 'window of interest' including a subset of the 'plurality of such seismic traces' 46 of FIG. 1E) comprises a plurality of seismic traces in the 'window of interest' having 'Unknown' geologic characteristics. In the embodiments disclosed herein, the synthetic model 62 does not include one or more traces from the input seismic volume 46. Rather, the synthetic model 62 represents a set of 'standard comparison traces having known geologic characteristics'. In particular, the synthetic model 62 is comprised of two or more traces having known geologic characteristics, whereas the input seismic volume 46 of FIG. 3A is comprised of two or more traces having unknown geologic characteristics. The Correlation Transform Software 14 receives the synthetic model 62 and the input seismic volume 46, and, responsive thereto, the Correlation Transform Software 14a cross-correlates each of the 'seismic trace like' traces of the Synthetic Model 62 with each of the traces in the 'window of interest' of the Input Seismic Volume 46 thereby generating a 'result' which comprises the Correlation Spectral Volume 54.

The 'further system and corresponding analysis method for analyzing an input seismic volume to determine a set of geologic characteristics of an Earth Formation', which was discussed above with reference to FIG. 3A, is set forth in more detail below with reference to FIG. 3A of the drawings.

In FIG. 3A, each of the plurality of 'seismic trace like' traces of the synthetic model 62 having 'Known' geologic characteristics is cross-correlated, via the correlation transform software 14, with each of the traces in the input seismic volume 46 having 'Unknown' geologic characteristics. To be more specific, synthetic model 62 trace 62a is cross-correlated, via the correlation transform software 14a, with each of the traces 46a, 46b, . . . , 46n of the input seismic volume 46 to thereby generate the first row 54a of correlation values on the Correlation Spectral Volume 54. That is, Synthetic Model 62 trace (1) 62a is cross-correlated with each of the traces of the Input Seismic Volume 46 thereby generating row (1) 54a of the Correlation Spectral Volume 54. Then, Synthetic Model 62 trace (2) 62b is cross-correlated with each of the traces of the Input Seismic Volume 46 thereby generating row (2) 54b of the Correlation Spectral Volume 54. This process continues until the last remaining Synthetic Model 62 trace (n) 62n is cross-correlated with each of the traces of the Input Seismic Volume 46 thereby generating the last remaining row of the Correlation Spectral volume 54. If a particular 'cross-correlation' value on the Correlation Spectral Volume 54 is a high value, this indicates that the geologic characteristic associated with one particular Synthetic Model trace substantially matches the geologic characteristic associated with one particular trace of the input seismic volume 46; and, since the geologic characteristic of the one particular Synthetic Model trace is a 'Known' quantity, then, the 'Unknown' geologic characteristic of the one particular trace of the input seismic volume 46 could be interpreted as substantially equal to the 'Known' geologic characteristic of the one particular Synthetic Model trace. As a result, the Unknown geologic characteristics of one or more traces of the input seismic volume 46 can be determined from the Known geologic characteristics of one or more of the Synthetic Model traces 62 by viewing the 'cross-correlation values' appearing on the Correlation Spectral Volume 54. A sample Correlation Spectral Volume 54 can be seen in FIGS. 8A–8C of the drawings.

In FIG. 3B, a more detailed discussion of the functional operation of the system and corresponding analysis method set forth in FIGS. 2 and 3A, for analyzing an input seismic volume to determine a set of geologic characteristics of an Earth Formation', is illustrated. In FIG. 3B, the kernel functions or, alternatively, the synthetic model are represented by block 52/62; whereas the autocorrelation functions or, alternatively, the input seismic volume are represented by block 50/46 in FIG. 3B. The correlation spectral volume is still represented by block 54 and the correlation transform software is still represented by block 14a. The kernel functions or synthetic model 52/62 include, by way of example only, traces 110, 112, 114, and 116. The autocorrelation functions or input seismic volume 50/46 includes, by way of example only, traces 120, 122, 124, 126, 128, and 130.

In operation, referring to FIG. 3B, we begin by plotting the first row of the correlation spectral volume 54. Trace 110 of the Kernel functions or Synthetic model 52/62 is cross-correlated, by using the correlation transform software 14a, with trace 120 of the autocorrelation functions or input seismic volume 50/46 to produce a value 'X1', which value 'X1' is plotted on the first row of the correlation spectral volume 54. Next, trace 110 is cross-correlated with trace 122 to produce value 'X2' which is plotted on the first row of the correlation spectral volume 54. Next, trace 110 is cross-correlated with trace 124 to produce value 'X3' which is plotted on the first row of the correlation spectral volume 54. Next, trace 110 is cross-correlated with trace 126 to produce value 'X4' which is plotted on the first row of the correlation spectral volume 54. Next, trace 110 is cross-correlated with trace 128 to produce value 'X5' which is plotted on the first row of the correlation spectral volume 54. Next, trace 110 is cross-correlated with trace 130 to produce value 'X6' which is plotted on the first row of the correlation spectral volume 54. The first row of the correlation spectral volume 54 has now been completely plotted. Unique colors are assigned to the values 'X1' through 'X6' depending on the numerical values of 'X1' through 'X6'.

In FIG. 3B, we now plot the second row of the correlation spectral volume 54. Trace 112 of the kernel functions or synthetic model 52/62 is cross-correlated, using the correlation transform software 14a, with trace 120 of the autocorrelation functions or input seismic volume 50/46 to produce value 'X7' which is plotted on the second row of the correlation spectral volume 54. Next, trace 112 is cross-correlated with trace 122 to produce value 'X8' which is plotted on the second row of the correlation spectral volume 54. Next, trace 112 is cross-correlated with trace 124 to produce value 'X9' which is plotted on the second row of the correlation spectral volume 54. Next, trace 112 is cross-correlated with trace 126 to produce value 'X10' which is plotted on the second row of the correlation spectral volume 54. Next, trace 112 is cross-correlated with trace 128 to produce value 'X11' which is plotted on the second row of the correlation spectral volume 54. Next, trace 112 is cross-correlated with trace 130 to produce value 'X12' which is plotted on the second row of the correlation spectral volume 54. Unique colors are assigned to the values 'X7' through 'X12' depending on the numerical values of 'X7' through 'X12'.

In FIG. 3B, we now plot the third row of the correlation spectral volume 54. Trace 114 of the Kernel functions or Synthetic model 52/62 is cross-correlated, using the correlation transform software 14a, with trace 120 of the autocorrelation functions or input seismic volume 50/46 to produce value 'X13' which is plotted on the third row of the correlation spectral volume 54. Next, trace 114 is cross-correlated with trace 122 to produce value 'X14' which is plotted on the third row of the correlation spectral volume 54. Next, trace 114 is cross-correlated with trace 124 to produce value 'X15' which is plotted on the third row of the correlation spectral volume 54. Next, trace 114 is cross-correlated with trace 126 to produce value 'X16' which is plotted on the third row of the correlation spectral volume 54. Next, trace 114 is cross-correlated with trace 128 to produce value 'X17' which is plotted on the third row of the correlation spectral volume 54. Next, trace 114 is cross-correlated with trace 130 to produce value 'X18' which is plotted on the third row of the correlation spectral volume 54. Unique colors are assigned to the values 'X13' through 'X18' depending on the numerical values of 'X13' through 'X18'.

In FIG. 3B, we now plot the fourth row of the correlation spectral volume 54. Trace 116 of the Kernel functions or Synthetic model 52/62 is cross-correlated, using the correlation transform software 14a, with trace 120 of the autocorrelation functions or input seismic volume 50/46 to produce value 'X19' which is plotted on the fourth row of the correlation spectral volume 54. Next, trace 116 is cross-correlated with trace 122 to produce value 'X20' which is plotted on the fourth row of the correlation spectral volume 54. Next, trace 116 is cross-correlated with trace 124 to produce value 'X21' which is plotted on the fourth row of the correlation spectral volume 54. Next, trace 116 is cross-correlated with trace 126 to produce value 'X22' which is plotted on the fourth row of the correlation spectral volume 54. Next, trace 116 is cross-correlated with trace 128 to produce value 'X23' which is plotted on the fourth row of the correlation spectral volume 54. Next, trace 116 is cross-correlated with trace 130 to produce value 'X24' which is plotted on the fourth row of the correlation spectral volume 54. Unique colors are assigned to the values 'X19' through 'X24' depending on the numerical values of 'X19' through 'X24'.

Referring to FIGS. 4, 5A, 6, and 7, a detailed flowchart of the Correlation Transform Software 14a of FIGS. 1, 2, 3A and 3B is illustrated.

Figure 4:
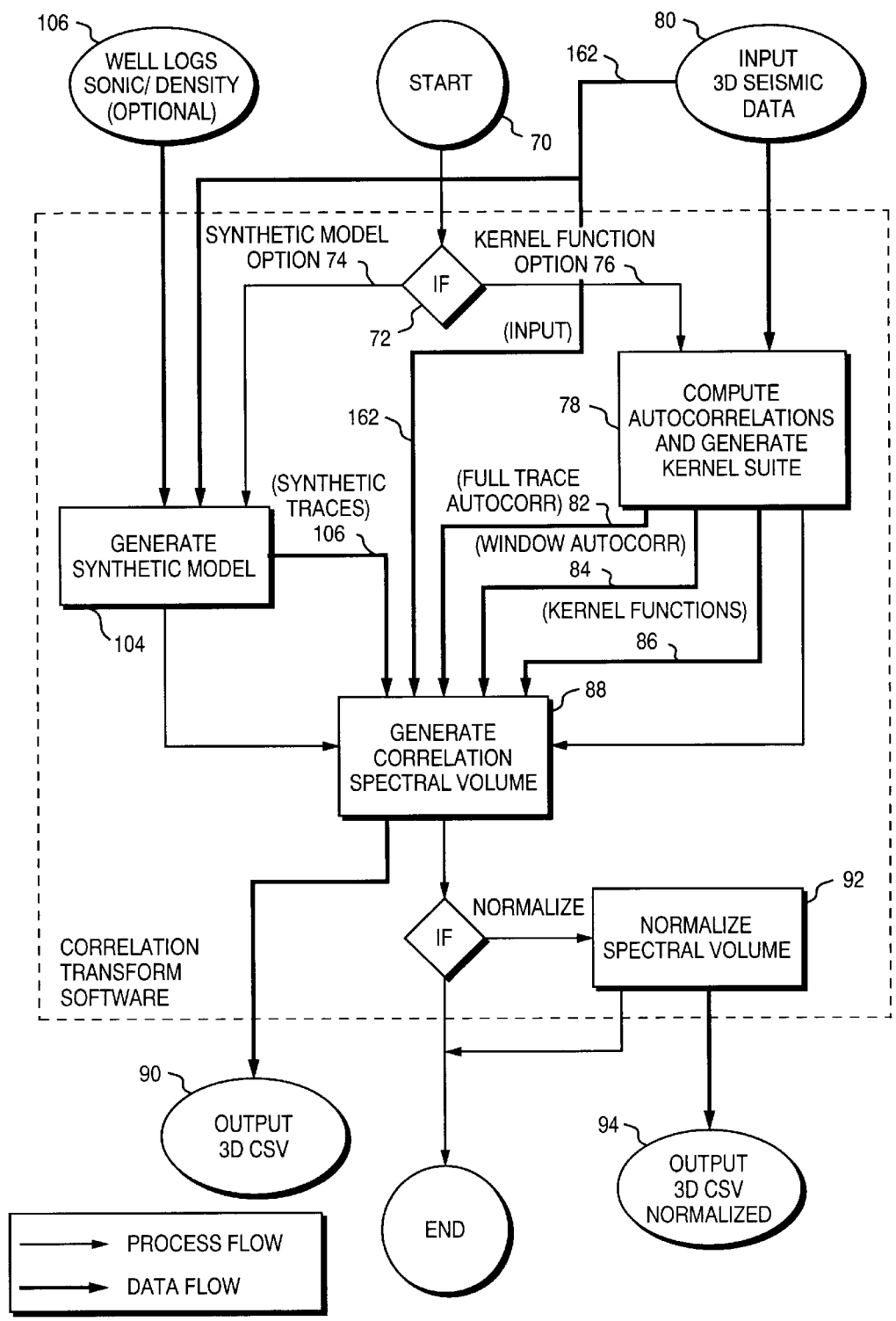
FIGS. 4, 5A, 6, and 7 illustrate a flowchart of the 'correlation transform software' of the present invention.

In FIG. 4, beginning at the 'start' position 70, in a decision triangle 72, a decision must be made whether to use the 'synthetic model option' 74 illustrated in FIG. 3 or the 'kernel function option' 76 illustrated in FIG. 2. Lets use the 'kernel function option' 76, then, we will examine the 'synthetic model option' 74.

Kernel Function Option 76

In FIG. 4, since we are using the 'kernel function option' 76, the next step is to execute the 'Compute Autocorrelations and Generate Kernel Suite' block 78. This block 78 receives 3D Seismic data 46 (representing the 'Input Seismic Volume' 46 in FIG. 2) from the 'Input 3D Seismic Data' block 80 in FIG. 4. This block 78 generates three outputs: full trace autocorrelations 82 and window autocorrelations 84 representing Autocorrelation Functions 50 in FIG. 2, and Kernel Functions 86 representing Kernel Functions 52 in FIG. 2. Recall that the Autocorrelation Functions 50 in FIG. 2 include only a portion of the full trace autocorrelations that are included within a certain window. In FIG. 4, in response to the full trace autocorrelation/window autocorrelation 82, 84 and the kernel functions 86, block 88 of FIG. 4 entitled 'Generate Correlation Spectral Volume' will now generate the Correlation Spectral Volume 54 of FIG. 2 in the manner discussed above with reference to FIG. 2. The Correlation Spectral Volume 54 of FIG. 2, output from block 88 in FIG. 4, can be provided as an output in the 'Output 3D CSV' block 90. Alternatively, the Correlation Spectral Volume 54 of FIG. 2, output from block 88 in FIG. 4, can undergo normalization via the 'Normalize Spectral Volume' block 92; in this case, the 'normalized Correlation Spectral Volume' can be provided as an output in the 'Output 3D CSV Normalized' block 94.

Figure 5A:
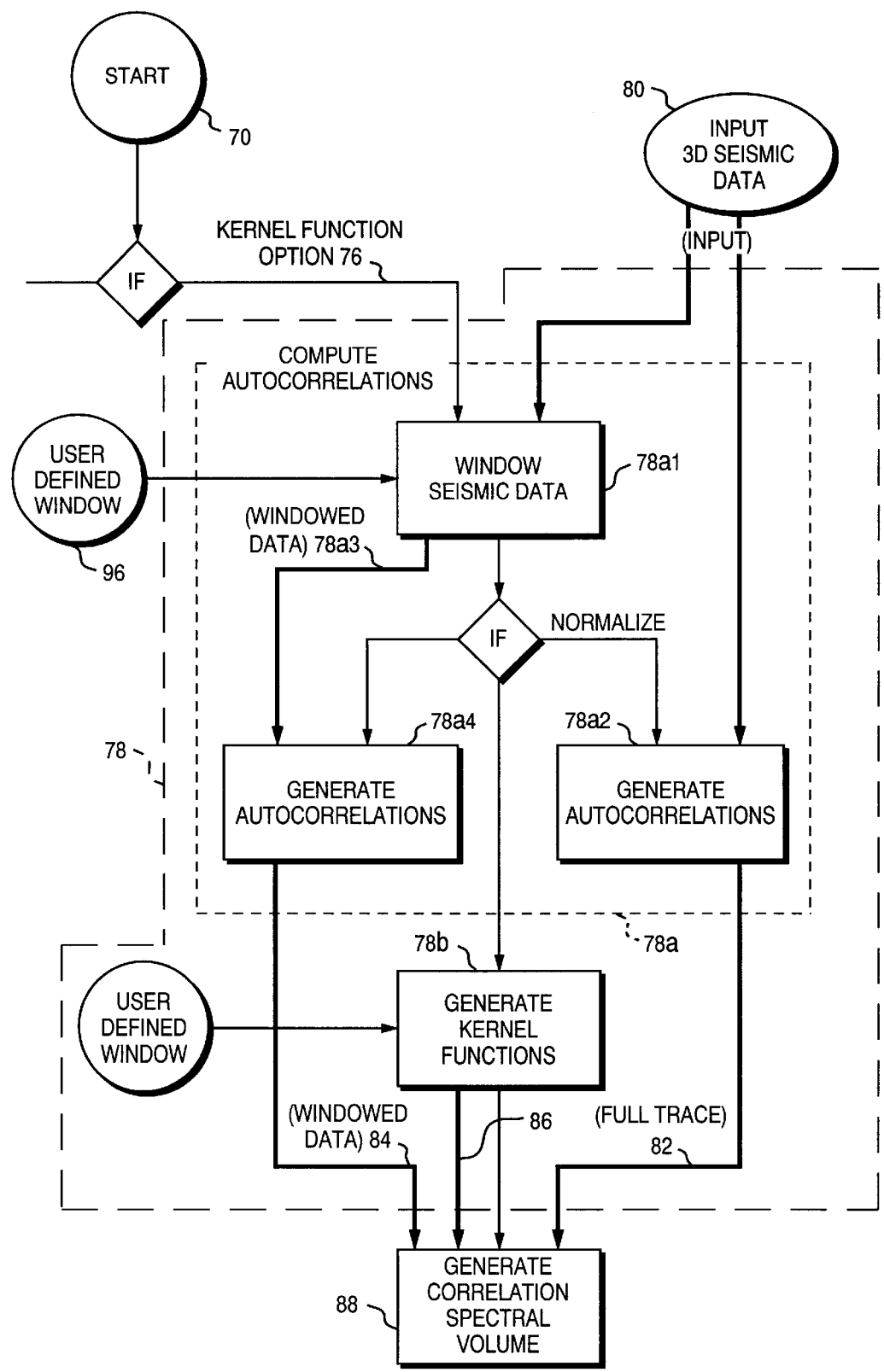

In FIG. 5A, a more detailed construction of the 'Compute Autocorrelations and Generate Kernel Suite' block 78 of FIG. 4 is illustrated. In FIG. 5A, the 'Compute Autocorrelations and Generate Kernel Suite' block 78 includes the 'Compute Autocorrelations' block 78a and the 'Generate Kernel Functions' block 78b. In the 'Compute Autocorrelations' block 78a, the 'Input 3D Seismic data' block 80 from FIG. 4 is provided as input data to the 'window seismic data' block 78a1 and the 'generate autocorrelations' block 78a2. Recall that the 'Input 3d Seismic data' of block 80 represents the 'Input Seismic volume' block 46 of FIG. 2 which, in turn, represents received seismic data that is centered about a certain window. The 'window seismic data' block 78a1 receives the 'Input Seismic volume' (of block 46 of FIG. 2) and determines only a portion of that 'Input Seismic volume' by locating that portion of the seismic data volume which is centered about a certain 'window' in accordance with a 'User Defined Window' 96. As a result, the output from the 'window seismic data' block 78a1 of FIG. 5A is called 'windowed data' 78a3. The 'Generate Autocorrelations' block 78a4 generates a plurality of 'windowed data' autocorrelation functions 84 corresponding, respectively, to a plurality of the 'windowed data' 78a3 (see the 'Autocorrelation Functions' 50 of FIG. 2). On the other hand, the 'Generate Autocorrelations' block 78a2 receives the 'Input 3D Seismic data' 80 and generates a plurality of 'full trace' autocorrelation functions 82 corresponding, respectively, to a plurality of the 'Input 3d Seismic data' 80 (see the 'Autocorrelation functions' 50 of FIG. 2). In addition, in response to the 'Window Seismic Data' 78a1, the 'Generate Kernel Functions' block 78b of FIG. 5A will 'Generate Kernel Functions' 86.

Figure 7:
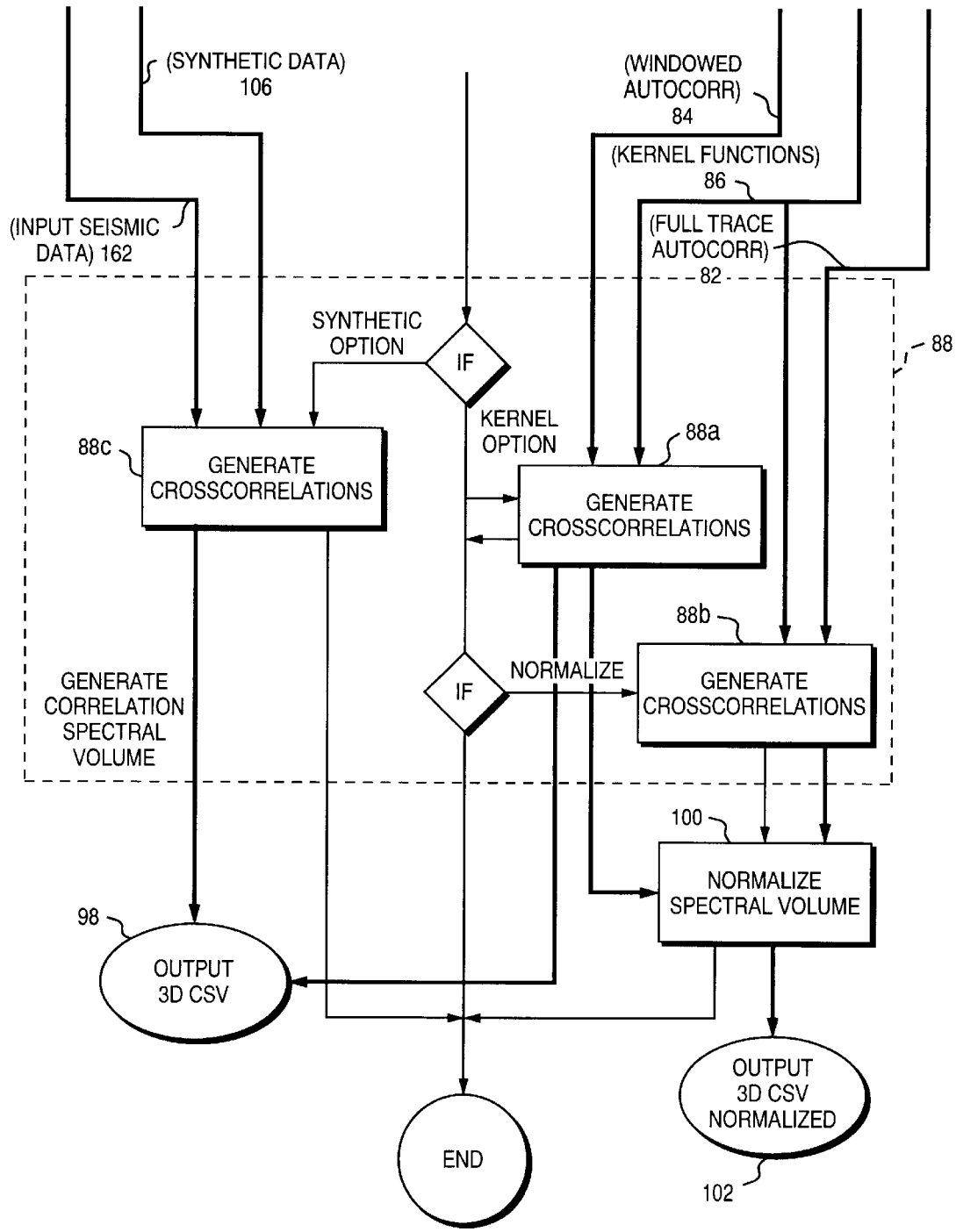

In FIG. 7, a more detailed construction of the 'Generate Correlation Spectral Volume' block 88 of FIG. 4 is illustrated. In FIG. 7, in response to the 'windowed autocorrelations' 84 and the 'kernel functions' 86, the 'generate cross-correlations' block 88a will generate a plurality of cross-correlation values in the manner discussed above with reference to FIG. 2 (recall that, in FIG. 2, each of the Kernel Functions 52 undergo cross-correlation with each of the Autocorrelation Functions 50, via the correlation transform software 14a, and, as a result, the correlation spectral volume 54 is generated). The Correlation Spectral Volume 54 of FIG. 2 is generated and represents the output set forth in the 'Output 3DCSV' block 98. Alternatively, the Correlation Spectral Volume 54 output from the 'Generate Crosscorrelations' block 88a in FIG. 7 can be normalized, via the 'Normalized Spectral volume' block 100, and a 'normalized Correlation Spectral volume' 54 is generated, the 'normalized correlation spectral volume' 54 being provided as 'Output 3DCSV Normalized' block 102. Furthermore, the 'Full Trace Autocorrelations' 82 and the 'Kernel Functions' 86 are provided as inputs to the 'Generate Crosscorrelations' block 88b, and 'another Correlation Spectral Volume 54' is generated (in the manner discussed above with reference to FIG. 2), said 'another Correlation Spectral Volume 54' being normalized via the 'Normalize Spectral Volume' block 100 to produce the 'Output 3DCSV Normalized' block 102 of FIG. 7.

Synthetic Model Option 74

In FIG. 4, since we are using the 'synthetic model option' 74, the next step is to execute the 'Generate Synthetic Model' block 104. The 'Generate Synthetic Model' block 104 is responsive to the 'Input 3D Seismic data' from block 80 and well logs and sonic/density data from the 'Well logs Sonic/Density' block 106. In FIG. 3A, recall that a geologic model 60 represents a 'set of known characteristics of an Earth Formation'. Recall also that the synthetic model 62 includes a plurality of synthesized seismic traces which:

(1) could have been obtained by reflection off the horizons of the geologic model 60, (2) directly correspond to the geologic model 60, and (3) also include the same 'set of known characteristics of an Earth Formation'. In FIG. 3A, each synthesized seismic trace of the synthetic model 62 is cross-correlated with each seismic trace of the input seismic volume 46 to thereby generate the correlation spectral volume 54. Therefore, in FIG. 4, the 'Generate Synthetic Model' block 104 will generate the synthetic model 62 of FIG. 3A. The 'synthetic traces' output 106 from block 104 in FIG. 4 therefore represents the synthetic model 62. In FIG. 4, the 'Generate Correlation Spectral volume' block 88 receives the 'synthetic traces' output 106 representing the synthetic model 62, and it also receives the 'Input seismic volume' 46 which is output from the 'Input 3D Seismic data' block 80 and, responsive thereto, block 88 in FIG. 4 will generate the 'Correlation Spectral Volume' block 54 of FIGS. 3A and 3B. The Correlation Spectral Volume 54, which is output from block 88 in FIG. 4, is provided as an output in the 'Output 3DCSV' block 90, or a normalized Correlation Spectral Volume 54 is output from block 88 and is provided as an output in the 'Output 3D CSV Normalized' block 94 in FIG. 4.

Referring to FIGS. 5B through 5G, 6, and 7 a detailed construction of the 'Generate Synthetic Model' block 104 of FIG. 4 is illustrated.

Figure 5G:
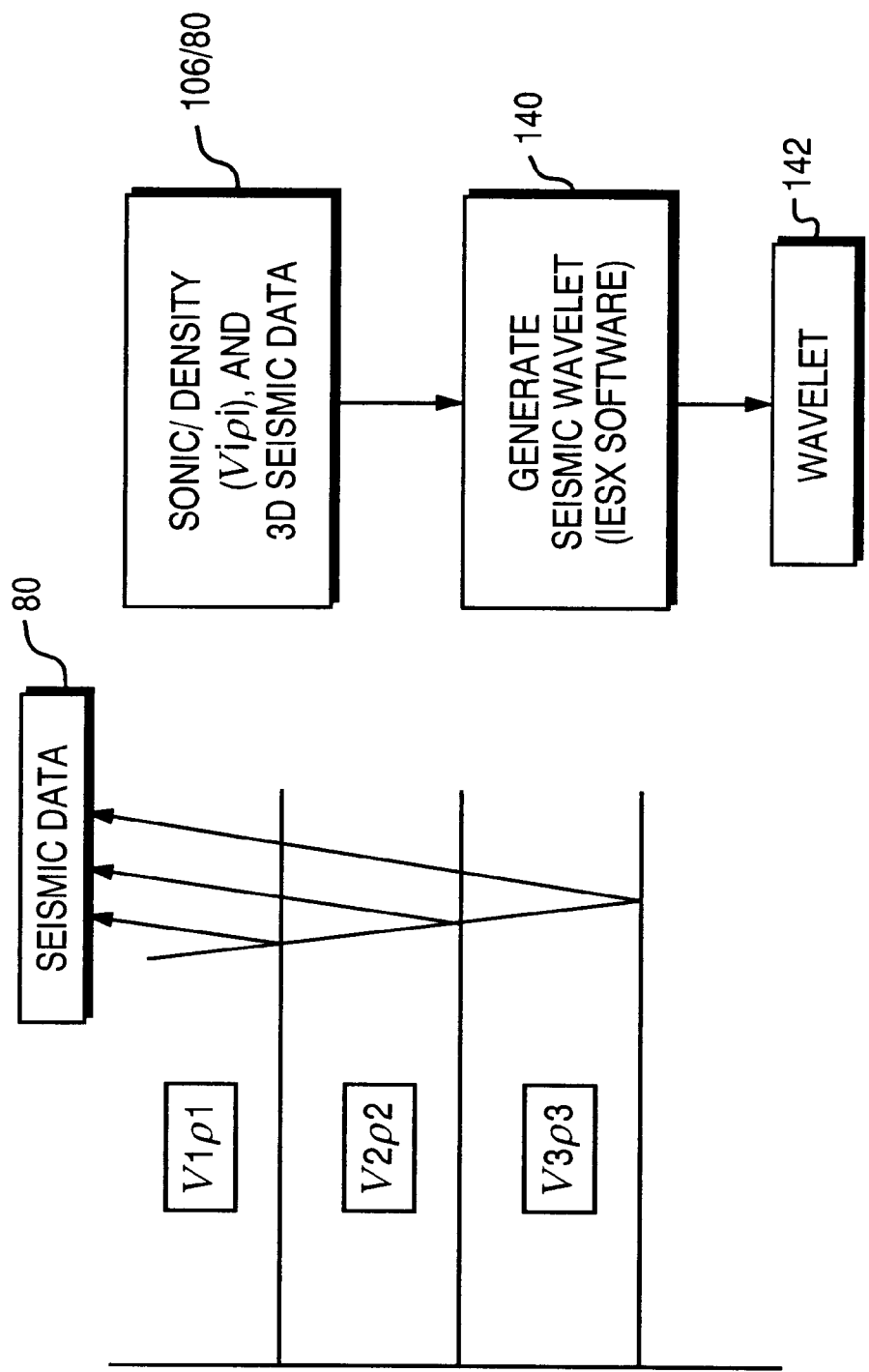
Figure 6:
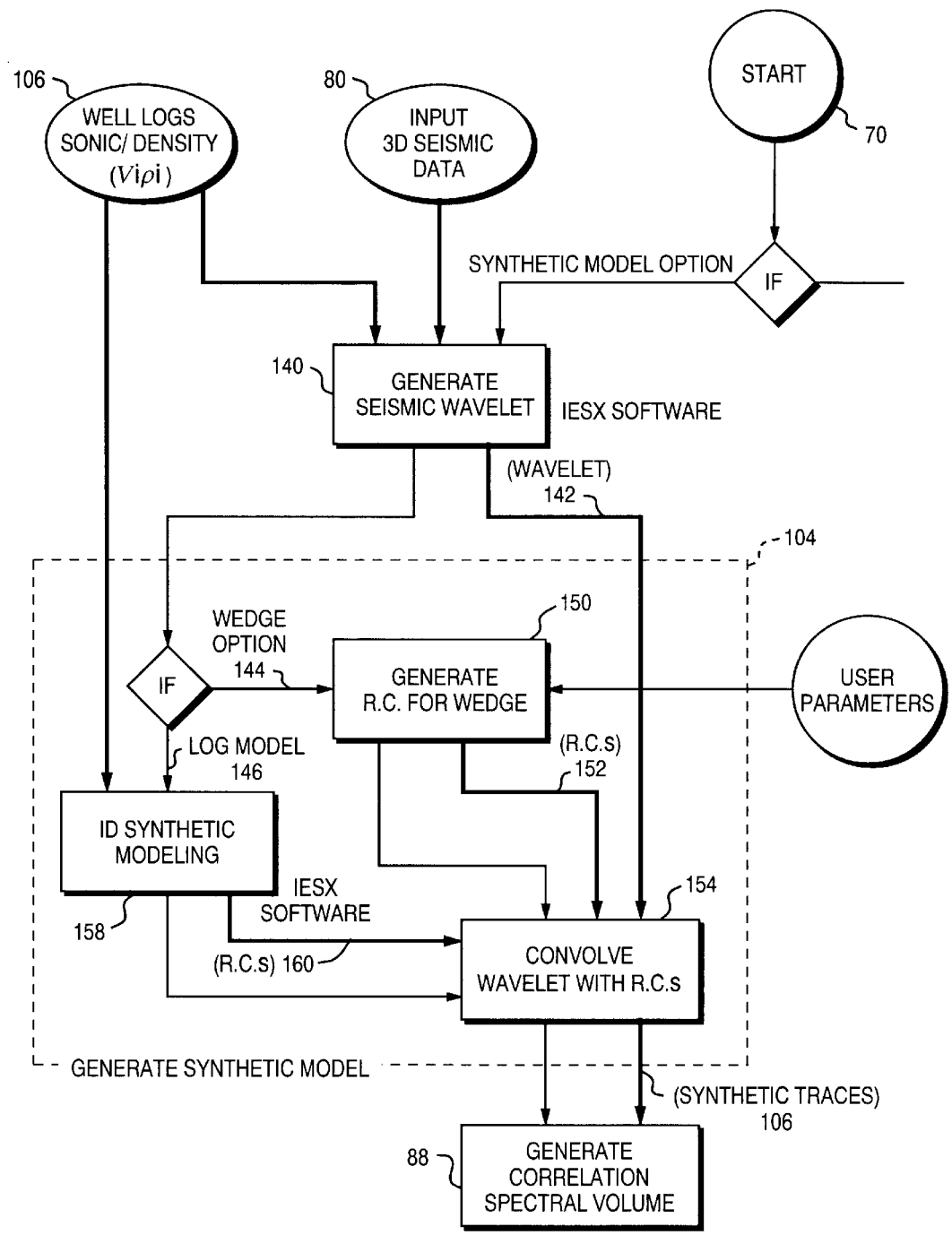

In FIGS. 5B through 5G, 6, and 7, referring initially to FIG. 6, well log information 106 includes sonic information representing the velocity of the rock in a well (Vi) and density information representing the density of the rock in the well ($\rho_i$). Therefore, the sonic and density information in block 106 of FIG. 6, obtained from well logs, are represented by the characters (Vi) and ($\rho_i$), where i=1, 2, 3, etc. Of course, the 3D seismic data 80 in FIG. 6 represents the input seismic volume 46 of FIGS. 2, 3A and 3B. In FIG. 6, the first block of FIG. 6 which we will discuss below is the 'Generate Seismic Wavelet' block 140 in FIG. 6. The function of the 'Generate Seismic Wavelet' block 140 is performed by a software package known as the "IESX software" which can be purchased from 'Schlumberger Information Solutions', otherwise known as 'GeoQuest', a division of 'Schlumberger Technology Corporation, Houston, Tex. However, referring to FIG. 5G, the 'Sonic and Density information (Vi) and ($\rho_i$)' which characterize the different stratigraphic layers in an Earth formation (e.g., $V_1\rho_1, V_2\rho_2, V_3\rho_3$) in addition to 'Seismic data', which is obtained by reflecting acoustic energy off the horizons of the Earth formation, 106/80 are provided as input data to the 'Generate Seismic Wavelet' block 140 (recall that the block 140 is the "IESX software" which can be purchased from Schlumberger Information Solutions, a division of Schlumberger Technology Corporation). The output from block. 140 in FIG. 5G is a 'Seismic Wavelet' 142, the 'Seismic Wavelet' being illustrated again in FIG. 5D and representing the output of block 140 ('wavelet') in FIG. 6. Referring again to FIG. 6, the next step involves generation of reflection coefficients (R.C.). One way to generate the RC's is the 'wedge option' 144, and another way to generate the RC's is the 'log model' option 146. In order to understand what a 'reflection coefficient' means, refer now to FIG. 5B. In FIG. 5B, a geologic model of an Earth formation includes three stratigraphic layers in a formation, where a first layer in the Earth formation is characterized by the sonic/density information of V1ρ1, a second layer is characterized by the sonic/density information of V2ρ2, and a third layer is characterized by the sonic/density information of V3ρ3. In FIG. 5B, an acoustic wave (similar to the acoustic wave shown in FIG. 5G) 148 reflects off point B1 on a first horizon in the formation and then it reflects off point B2 on a second horizon in the formation. In FIG. 5C, the 'reflection coefficient' RC is calculated with knowledge of the sonic/density information V1ρ1 and V2ρ2 of FIG. 5B. In FIG. 5C, the 'reflection coefficient' RC at point B1 on the first horizon of the Earth formation, where the sonic/density data in the first stratigraphic layer is V1ρ1 and the sonic/density data in the second stratigraphic layer is V2ρ2 is: RC=[V2 ρ2−V1ρ1]/ [V2ρ2+V1ρ1]. In FIG. 5D, a received seismic wavelet corresponding to the acoustic wave 148 of FIG. 5B is illustrated. In FIG. 5E, the 'reflection coefficient' RC at point B1 on the first horizon of FIG. 5B, corresponding to the received seismic wavelet of FIG. 5D, is also illustrated. In FIG. 5E, the 'reflection coefficient' RC at point B2 on the second horizon of FIG. 5B is also illustrated. Referring now to FIG. 6, assume now that we take the 'wedge option' 144. In that case, the next step in the process is "Generate RC for Wedge", block 150 in FIG. 6. In this block 150 in FIG. 6, given the sonic/density information in FIG. 5B (V1ρ1, V2ρ2, V3ρ3), the 'reflection coefficient' (R.C.) is generated by use of the above equation: R.C.=[V2ρ2−V1$_\rho$1]/[V2ρ2+ V1ρ1], when the R.C. at point B1 of FIGS. 5B and 5E is calculated; and the (R.C.) is generated by use of the following equation: R.C.=[V3ρ3−V2 ρ2]/[V3ρ3+V2ρ2], when the (R.C) at point B2 of FIGS. 5B and 5E is calculated. In FIG. 6, the output data, generated from the 'Generate R.C. for Wedge' block 150, consists of 'reflection coefficients' R.C. 152. In the meantime, the 'wavelet' 142 in FIG. 6 (see also FIGS. 5D and 5G) is also generated as output data from the 'Generate Seismic Wavelet' block 140. The R.C.'s 152 and the 'wavelets' 142 are provided as 'input data' to the 'Convolve Wavelet with R.C.'s' block 154. In this 'Convolve Wavelet with R.C.'s' block 154 in FIG. 6, the R.C.'s 152 will undergo convolution with the 'wavelets' 142 by using the following 'convolution equation':

$$\phi_{GH}(\tau) = \frac{\sum_{k=-N}^{N} G(k)H(k-\tau)}{\left[\sum_{k=-N}^{N} G^2(k) \sum_{k=-N}^{N} H^2(k)\right]^{1/2}}$$

where G(k) and H(k) are the functions undergoing convolution.

In FIG. 6, the output of the 'Convolve Wavelet with R.C.'s block 154 consists of the 'synthetic traces' 106 which constitute the Synthetic Model 62 of FIG. 3A. The 'synthetic traces' 106 are provided as input data to the 'Generate Correlation Spectral Volume' block 88. Referring again to FIG. 6, assume now that we take the 'log model' 146 option. In that case, the sonic/density data $V_i\rho_i$ from block 106 in FIG. 6 is provided as 'input data' to the '1D Synthetic Modeling' block 158. This '1D Synthetic Modeling' block 158 generates the 'reflection coefficients' (R.C.) 160, as did the 'Generate R.C. for Wedge' block 150 in FIG. 6 which also generated the 'reflection coefficients' (R.C.). The '1D Synthetic Modeling' block 158 is actually part of the "IESX software", which is produced by 'Schlumberger Information Solutions', otherwise known as 'GeoQuest', a division of Schlumberger Technology Corporation, Houston, Tex. Recall that the 'Generate Seismic Wavelet' block 140 was also part of the "IESX software" produced by 'Schlumberger Information Solutions', a division of Schlumberger Technology Corporation, Houston, Tex. The 'reflection coefficients' (R.C.) 160, which are generated from the '1D Synthetic Modeling' block 158 in FIG. 6, are also provided as 'input data' to the 'Convolve Wavelet with R.C.s' block 154 where said R.C.'s 160 undergo convolution with the seismic 'wavelet' 142 (similar to the seismic 'wavelet' 142 of FIG. 5C) by using the convolution equation provided above. As a result, the 'synthetic traces' 106 of the 'Synthetic Model' 62 of FIG. 3A are generated from the 'Convolve Wavelet with R.C.s' block 154 in FIG. 6. The 'synthetic traces' 106 are provided as input data to the 'Generate Correlation Spectral Volume' block 88.

In FIGS. 5D, 5E, and 5F, recall that, in the 'Convolve Wavelet with R.C.'s' block 154 in FIG. 6, the R.C.'s 152 or 160 will undergo convolution with the seismic 'wavelets' 142 by using the above referenced 'convolution equation'. In FIGS. 5D, 5E, and 5F, the seismic wavelet 142 of FIG. 5D undergoes convolution with the 'reflection coefficients' (R.C.) of FIG. 5E to produce the synthetic trace of FIG. 5F, which is part of the 'synthetic model' 62 of FIG. 3A.

In FIG. 7, in the 'Generate Correlation Spectral Volume' block 88, as noted above, the 'synthetic traces' 106 are provided as input data to the 'Generate Correlation Spectral Volume' block 88. In FIG. 4, in addition, Input Seismic Data from block 80 is provided, via data line 162, as input data to the 'Generate Correlation Spectral Volume' block 88. Consequently, in FIG. 7, the 'Generate Correlation Spectral Volume' block 88 receives (in addition to the full trace autocorrelation/window autocorrelation 82, 84 and the kernel functions 86), the input seismic data 162 from block 80 in FIG. 4 and the synthetic trace data 106 from block 154 in FIG. 6. In FIG. 7, the input seismic data 162 and the synthetic data 106 are provided as input data to the 'Generate Crosscorrelations' block 88c. Here, in block 88c of FIG. 7, each of the synthetic traces in the synthetic data 106 undergoes cross-correlation with each of the traces of the input seismic data 162 in the same manner that each of the synthetic traces in the synthetic model 62 in FIGS. 3A, 3B, and 4 underwent cross-correlation with each of the traces of the input seismic data 46 in FIGS. 3A, 3B, and 4 to produce the correlation spectral volume 54 in FIGS. 3A, 3B, and 4. Thus, the output from the 'Generate Crosscorrelations' block 88c in FIG. 7 is the 'Correlation Spectral Volume' 54 in FIGS. 2, 3A, and 3B. The 'Correlation Spectral Volume' is stored as 'Output 3DCSV' 98 in FIG. 7.

In FIG. 7, blocks 88a, 88b, and 88c are each responsible for 'generating cross-correlations'. Each of the blocks 88a, 88b, and 88c in FIG. 7 generate the 'cross-correlations' by executing the following mathematical operations set forth in the following 'cross-correlation equation':

$$\phi_{GH}(\tau) = \frac{\sum_{k=-N}^{N} G(k)H(k+\tau)}{\left[\sum_{k=-N}^{N} G^2(k) \sum_{k=-N}^{N} H^2(k)\right]^{1/2}}$$

where G(k) and H(k) are the functions undergoing cross-correlation.

Referring to FIGS. 8a, 8b, and 8c, examples of the Correlation Spectral Volume 54 of FIGS. 2, 3A and 3B, which are generated by block 88 of FIG. 4, are illustrated.

A complete functional description of the operation of the computer system 10 of FIG. 1A, when the processor 12 executes the correlation transform software 14a of FIG. 1A for generating the Correlation Spectral Volume 22 of FIG. 1A, is set forth in the following paragraphs with reference to FIGS. 1A through 7 of the drawings.

In FIG. 1A, the correlation transform software 14a initially stored on the CD-Rom 20 is loaded into memory 14. The Processor 12, while receiving the input data 24 of FIG. 1A, executes the correlation transform software 14a which is stored in the memory 14 and, as a result, the recorder or display device 18 generates the 'Correlation Spectral Volume' 22 of FIG. 1A and/or the 'Correlation Spectral Volume' 54 of FIGS. 2, 3A, and 3B. Recall, from FIG. 3B, that each trace of the Kernel functions or the Synthetic model 52/62 is cross-correlated (using the Correlation Transform Software 14a) with each trace of the autocorrelation functions or input seismic volume data 50/46 to produce the correlation spectral volume 54. For example, in FIG. 3B, trace 110 is cross-correlated with each of traces 120 to 130 to produce values X1 through X6 which are plotted on the first row of the correlation spectral volume 54 in FIG. 3B, and colors are assigned to those values. Similarly, trace 112 is cross-correlated with each of traces 120 to 130 to produce values X7 through X12 which are plotted on the second row of the correlation spectral volume 54 in FIG. 3B and colors are assigned to those values. Trace 114 is cross-correlated with each of traces 120 to 130 to produce values X13 through X18 which are plotted on the third row of the correlation spectral volume 54 in FIG. 3B and colors are assigned to those values. Trace 116 is cross-correlated with each of traces 120 to 130 to produce values X19 through X24 which are plotted on the fourth and last row of the correlation spectral volume 54 in FIG. 3B and colors are assigned to those values. In FIG. 4, referring back to FIGS. 2 and 3B, the kernel functions 86 each undergo cross-correlation in the 'generate correlation spectral volume' block 88 with each of the full trace or windowed autocorrelation functions 84, 86 to produce the correlation spectral volume 54 of FIGS. 2 and 3B. On the other hand, in FIG. 4, referring back to FIG. 3A and 3B, the synthetic traces 106 of the synthetic model 62 each undergo cross-correlation, in the 'generate correlation spectral volume' block 88 of FIG. 4, with each of the seismic traces 162 of the input seismic data 80 to produce the correlation spectral volume 54 of FIGS. 3A and 3B. The correlation spectral volume 54 is stored in either block 90 or block 94 in FIG. 4.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for performing an analysis of a resultant set of seismic data, generated in response to a seismic operation performed on a particular portion of an Earth formation, to determine a set of geologic characteristics of the particular portion of the Earth formation, a first data set comprised of synthetic time series and having known geologic characteristics, a second data set having unknown geologic characteristics, comprising the steps of:

comparing said first data set having known geologic characteristics with said second data set having unknown geologic characteristics; and producing an output record in response to the comparing step, said output record recording or displaying a degree to which the unknown geologic characteristics of said second data set substantially matches one or more of the known geologic characteristics of said first data set.

2. The method of claim 1, wherein said second data set having said unknown geologic characteristics includes an input seismic volume, and wherein said first data set having said known geologic characteristics does not include one or more traces from said input seismic volume.

3. The method of claim 2, wherein said first data set having said known geologic characteristics includes a set of traces that are usable as standard comparison traces having known geologic characteristics.

4. The method of claim 3, wherein said first data set having said known geologic characteristics comprises two or more traces having known geologic characteristics.

5. The method of claim 4, wherein said first data set having said known geologic characteristics includes a Synthetic Model derived from a Geologic Model.

6. The method of claim 5, wherein said second data set having said unknown geologic characteristics includes either a plurality of autocorrelation functions that are derived from a corresponding plurality of traces from said input seismic volume or said plurality of traces from said input seismic volume.

7. A program storage device readable by a machine, tangibly embodying a program of instructions executable by the machine to perform method steps for performing an analysis of a resultant set of seismic data, generated in response to a seismic operation performed on a particular portion of an Earth formation, to determine a set of geologic characteristics of the particular portion of the Earth formation, a first data set comprised of synthetic time series and having known geologic characteristics, a second data set having unknown geologic characteristics, said method steps comprising:

comparing said first data set having known geologic characteristics with said second data set having unknown geologic characteristics; and producing an output record in response to the comparing step, said output record recording or displaying a degree to which the unknown geologic characteristics of said second data set substantially matches one or more of the known geologic characteristics of said first data set.

8. The program storage device of claim 7, wherein said second data set having said unknown geologic characteristics includes an input seismic volume, and wherein said first data set having said known geologic characteristic does not include one or more traces from said input seismic volume.

9. The program storage device of claim 8, wherein said first data set having said known geologic characteristic includes a set of traces that are usable as standard comparison traces having known geologic characteristics.

10. The program storage device of claim 9, wherein said first data set having said known geologic characteristic comprises two or more traces having known geologic characteristics.

11. The program storage device of claim 10, wherein said first data set having said known geologic characteristic includes a Synthetic Model derived from a Geologic Model.

12. The program storage device of claim 11, wherein said second data set having said unknown geologic characteristic includes either a plurality of autocorrelation functions that are derived from a corresponding plurality of traces from said input seismic volume or said plurality of traces from said input seismic volume.

13. A method for performing an analysis of a resultant set of seismic data, generated in response to a seismic operation performed on a particular portion of an Earth formation, to determine a set of geologic characteristics of the particular portion of the Earth formation, a first data set comprised of synthetic time series and having known geologic characteristics including two or more traces and further including a first trace and a second trace, a second data set having unknown geologic characteristics including two or more traces and further including a first trace and a second trace, said second data set including two or more traces from an input seismic volume, said first data set not including any traces from said input seismic volume, comprising the steps of:

(a) cross correlating each of said traces of said first data set having said known geologic characteristics with each of said traces of said second data set having said unknown geologic characteristics; and (b) producing an output record in response to the cross correlating step, said output record recording or displaying a degree to which the unknown geologic characteristics of said second data set substantially matches one or more of the known geologic characteristics of said first data set.

14. The method of claim 13, wherein the cross correlating step (a) comprises the steps of:

(a1) cross correlating said first trace from said first data set having known geologic characteristics with said first trace from said second data set having said unknown geologic characteristics and generating a first result, (a2) cross correlating said first trace from said first data set having known geologic characteristics with said second trace from said second data set having said unknown geologic characteristics and generating a second result, (a3) cross correlating said second trace from said first data set having known geologic characteristics with said first trace from said second data set having said unknown geologic characteristics and generating a third result, (a4) cross correlating said second trace from said first data set having known geologic characteristics with said second trace from said second data set having said unknown geologic characteristics and generating a fourth result.

15. The method of claim 14, wherein the producing step (b) comprises the steps of:

(b1) plotting said first result on a first location of said output record, (b2) plotting said second result on a second location of said output record, (b3) plotting said third result on a third location of said output record, and (b4) plotting said fourth result on a fourth location of said output record, said output record recording and displacing degree to which the unknown geologic characteristics of said second data set substantially matches one or more of the known geologic characteristics of said first data set.

16. A program storage device readable by a machine, tangibly embodying a program of instructions executable by the machine to perform method steps for performing an analysis of a resultant set of seismic data, generated in response to a seismic operation performed on a particular portion of an Earth formation, to determine a set of geologic characteristics of the particular portion of the Earth formation, a first data set comprised of synthetic time series and having known geologic characteristics including two or more traces and further including a first trace and a second trace, a second data set having unknown geologic characteristics including two or more traces and further including a first trace and a second trace, said second data set including two or more traces from an input seismic volume, said first data set not including any traces from said input seismic volume, said method steps comprising:

(a) cross correlating each of said traces of said first data set having said known geologic characteristics with each of said traces of said second data set having said unknown geologic characteristics; and (b) producing an output record in response to the cross correlating step, said output record recording or displaying a degree to which the unknown geologic characteristics of said second data set substantially matches one or more of the known geologic characteristics of said first data set.

17. The program storage device of claim 16, wherein the cross correlating step (a) comprises the steps of:

(a1) cross correlating said first trace from said first data set having known geologic characteristics with said first trace from said second data set having said unknown geologic characteristics and generating a first result, (a2) cross correlating said first trace from said first data set having known geologic characteristics with said second trace from said second data set having said unknown geologic characteristics and generating a second result, (a3) cross correlating said second trace from said first data set having known geologic characteristics with said first trace from said second data set having said unknown geologic characteristics and generating a third result, (a4) cross correlating said second trace from said first data set having known geologic characteristics with said second trace from said second data set having said unknown geologic characteristics and generating a fourth result.

18. The program storage device of claim 17, wherein the producing step (b) comprises the steps of:

(b1) plotting said first result on a first location of said output record, (b2) plotting said second result on a second location of said output record, (b3) plotting said third result on a third location of said output record, and (b4) plotting said fourth result on a fourth location of said output record, said output record recording or displaying a degree to which the unknown geologic characteristics of said second data set substantially matches one or more of the known geologic characteristics of said first data set.

19. A method of generating a correlation spectral volume, comprising the steps of:

(a) receiving a first plurality of traces comprised of synthetic time series and representing a set of standard comparison traces having known geologic characteristics;

(b) receiving a second plurality of traces having unknown geologic characteristics, said second plurality of traces comprising a portion of either an autocorrelation of an input seismic volume or said input seismic volume, said first plurality of traces including a Synthetic model derived from a Geologic model but not including one or more traces from said input seismic volume, the derivation of said Synthetic model including the use of the following convolution equation:

$$\phi_{GH}(\tau) = \frac{\sum_{k=-N}^{N} G(k)H(k-\tau)}{\left[\sum_{k=-N}^{N} G^2(k) \sum_{k=-N}^{N} H^2(k)\right]^{1/2}}$$

where the functions G(k) and H(k) are undergoing convolution; and (c) cross correlating each of the traces of said first plurality of traces having known geologic characteristics with each of the traces of said second plurality of traces having unknown geologic characteristics to thereby generate said correlation spectral volume, said correlation spectral volume recording or displaying a degree to which the unknown geologic characteristics of said second plurality of traces substantially matches one or more of the known geologic characteristics of said first plurality of traces, the cross correlating step (c) being performed in accordance with the following equation:

$$\phi_{GH}(\tau) = \frac{\sum_{k=-N}^{N} G(k)H(k+\tau)}{\left[\sum_{k=-N}^{N} G^2(k) \sum_{k=-N}^{N} H^2(k)\right]^{1/2}}$$

where the function G(k) represents one of the first plurality of traces and the function H(k) represents one of the second plurality of traces.

20. The method of claim 19, wherein said first plurality of traces having known geologic characteristics include a first trace and a second trace, the second plurality of traces having unknown geologic characteristics including a first trace and a second trace, and wherein the cross correlating step (c) comprises the steps of:

cross correlating said first trace of said first plurality of traces with said first trace of said second plurality of traces thereby producing a first result, and plotting said first result on said correlation spectral volume;

cross correlating said first trace of said first plurality of traces with said second trace of said second plurality of traces thereby producing a second result, and plotting said second result on said correlation spectral volume;

cross correlating said second trace of said first plurality of traces with said first trace of said second plurality of traces thereby producing a third result, and plotting said third result on said correlation spectral volume; and cross correlating said second trace of said first plurality of traces with said second trace of said second plurality of traces thereby producing a fourth result, and plotting said fourth result on said correlation spectral volume.

21. A program storage device readable by a machine, tangibly embodying a program of instructions executable by the machine to perform method steps for generating a correlation spectral volume, said method steps comprising the steps of:

(a) receiving a first plurality of traces comprised of synthetic time series and representing a set of standard comparison traces having known geologic characteristics;

(b) receiving a second plurality of traces having unknown geologic characteristics, said second plurality of traces comprising a portion of either an autocorrelation of an input seismic volume or said input seismic volume, said first plurality of traces including a Synthetic model derived from a Geologic model but not including one or more traces from said input seismic volume, the derivation of said Synthetic model including the use of the following convolution equation:

$$\phi_{GH}(\tau) = \frac{\sum_{k=-N}^{N} G(k)H(k-\tau)}{\left[\sum_{k=-N}^{N} G^2(k) \sum_{k=-N}^{N} H^2(k)\right]^{1/2}}$$

where the functions G(k) and H(k) are undergoing convolution; and (c) cross correlating each of the traces of said first plurality of traces having known geologic characteristics with each of the traces of said second plurality of traces having unknown geologic characteristics to thereby generate said correlation spectral volume, said correlation spectral volume recording or displaying a degree to which the unknown geologic characteristics of said second plurality of traces substantially matches one or more of the known geologic characteristics of said first plurality of traces, the cross correlating step (c) being performed in accordance with the following equation:

$$\phi_{GH}(\tau) = \frac{\sum_{k=-N}^{N} G(k)H(k+\tau)}{\left[\sum_{k=-N}^{N} G^2(k) \sum_{k=-N}^{N} H^2(k)\right]^{1/2}}$$

where the function G(k) represents one of the first plurality of traces and the function H(k) represents one of the second plurality of traces.

22. The program storage device of claim 21, wherein said first plurality of traces having known geologic characteristics include a first trace and a second trace, the second plurality of traces having unknown geologic characteristics including a first trace and a second trace, and wherein the cross correlating step (c) comprises the steps of:

cross correlating said first trace of said first plurality of traces with said first trace of said second plurality of traces thereby producing a first result, and plotting said first result on said correlation spectral volume;

cross correlating said first trace of said first plurality of traces with said second trace of said second plurality of traces thereby producing a second result, and plotting said second result on said correlation spectral volume;

cross correlating said second trace of said first plurality of traces with said first trace of said second plurality of traces thereby producing a third result, and plotting said third result on said correlation spectral volume; and cross correlating said second trace of said first plurality of traces with said second trace of said second plurality of traces thereby producing a fourth result, and plotting said fourth result on said correlation spectral volume.

* * * * *